May 22, 1951 E. A. JONES 2,554,195
CROP HANDLING IMPLEMENT
Filed Feb. 9, 1948 2 Sheets-Sheet 1

INVENTOR.
Edwin A. Jones
BY
ATTORNEY

May 22, 1951    E. A. JONES    2,554,195
CROP HANDLING IMPLEMENT
Filed Feb. 9, 1948    2 Sheets-Sheet 2
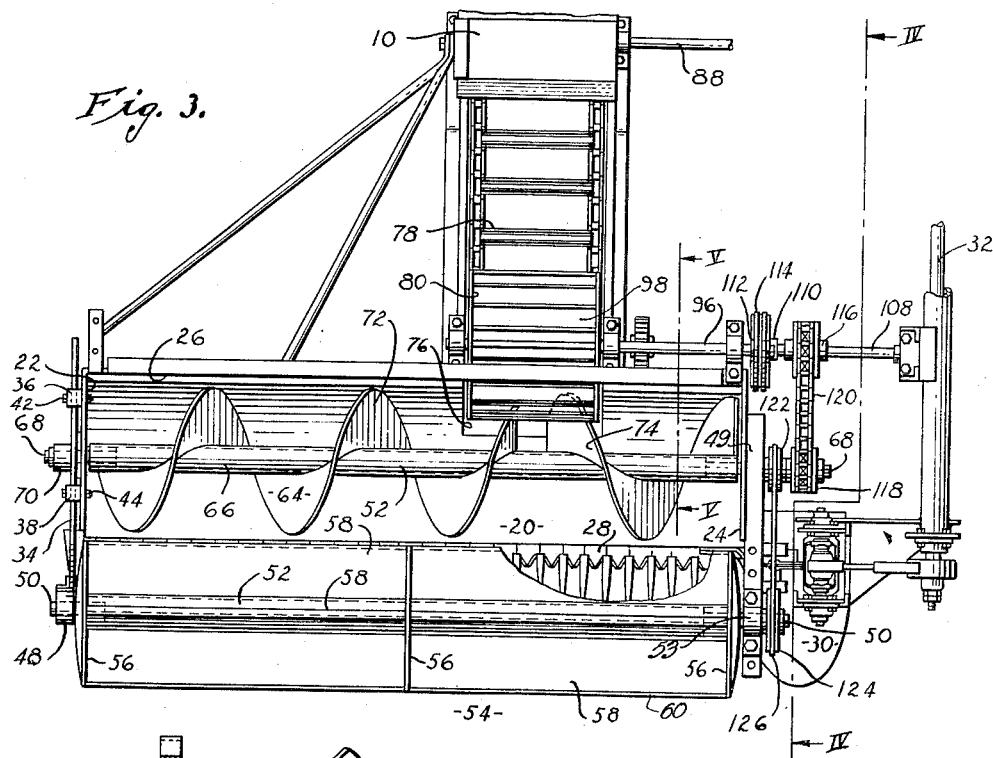
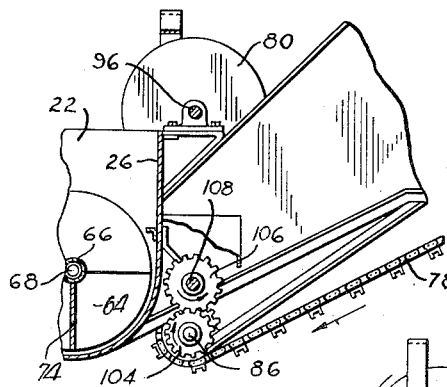
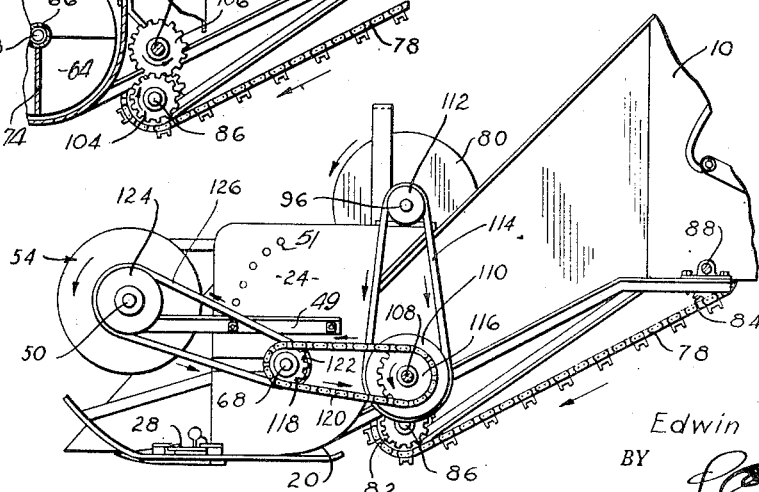
INVENTOR.
Edwin A. Jones
BY
ATTORNEY Patented May 22, 1951

2,554,195

UNITED STATES PATENT OFFICE 2,554,195

CROP HANDLING IMPLEMENT

Edwin A. Jones, Topeka, Kans.

Application February 9, 1948, Serial No. 7,232

3 Claims. (Cl. 56—167)

1

This invention relates broadly to farm implements and particularly to machinery for handling growing crops, the primary aim being to provide a crop handling implement having a combination of elements cooperable one with the other to control the path of travel in a desired manner through the machine itself.

The implement about to be described is designed for use particularly in the handling of growing crops such as hay. It is now quite generally known that the new principle of harvesting hay by a single operation of cutting the growing crop and chopping the same for deposit in a wagon or truck is not only the most economical method today known, but is labor saving and advantageous from the standpoint of producing a better product. Such chopped hay may subsequently be deposited in a dehydrator as is now becoming a wide-spread practice or may be fed directly into a silo or the like without additional handling at the silo for the purpose of grinding and chopping the same into relatively small particles.

Conventional implements of the character above outlined and on the market today are disadvantageous because of the fact that the individual stalks of the hay are permitted to move into the chopping means in a jumbled and disorderly fashion. Consequently the cutter itself does not work as efficiently and the same is not cut into the finest desired or the speed of operation must be slowed considerably to achieve such ends.

It is the most important object of this invention therefore, to provide a crop handling implement of the character above set forth that is capable of cutting the growing crop as the same is transported through a field thereof and moving the individual stalks of such cut hay to a rotatable chopper with all of the stalks thereof in alignment whereby such stalks may be moved into the chopper endways.

Another important object of this invention is the provision of a crop handling implement having a rotatable reel and a rotating helix associated therewith and cooperable to direct the individual stalks of hay as the same is cut flatly upon a platform therefor with all of the stalks in substantial parallelism.

A further object of this invention is the provision of a crop handling implement having a conveyor for receiving the stalks of hay and moving the same longitudinally toward a chopping means as the aforesaid helix slides such stalks of hay to a predetermined position in alignment with said conveyor.

Other objects of this invention lie in the particular manner in which the aforesaid parts all cooperate to achieve the end desired, i. e. maintaining the individual stalks of hay in a relative

2 predetermined condition, together with many minor objects, all of which will be made more clear as the following specification progresses, reference being had to accompanying drawings, wherein:

Fig. 3 is a top plan view thereof.

Fig. 4 is a cross-sectional view taken on irregular line IV—IV of Fig. 3 looking in the direction of the arrows; and Fig. 5 is a fragmentary detailed cross-sectional view taken on line V—V of Fig. 3 looking in the direction of the arrows.

Figures 1, 2:
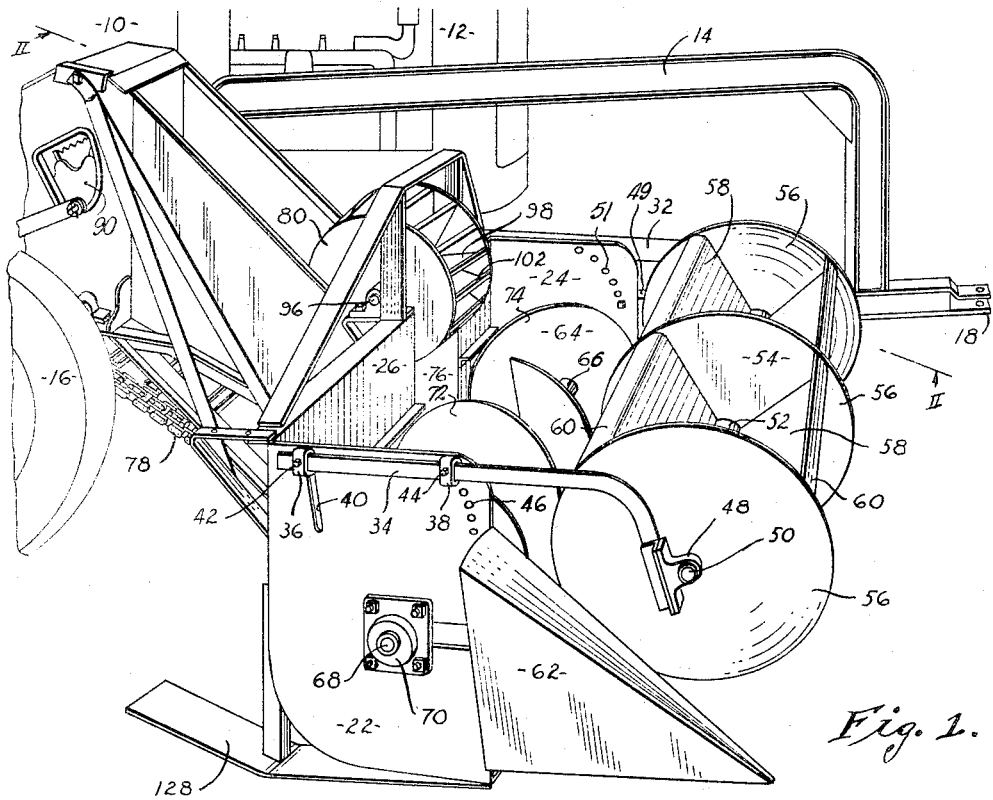
Fig. 1 is an end perspective view of a crop handling implement made in accordance with my present invention.
Fig. 2 is a transverse cross sectional view taken on line II—II of Figs. 1.

The crop handling implement forming the subject matter of this invention is designed for use with any type of cutter broadly designated by the numeral 10 having a prime mover 12. This cutter 10 forms no part of this invention and is mounted on suitable framework 14 having connection with a wheel and axle assembly 16 and being provided with means of attachment 18 to a tractor or the like.

The attachment about to be described is connected directly to the cutter 10 and is suitably mounted upon the frame 14 for transportation as a unit. The power-lift mechanism of the tractor may be connected in the conventional manner for rendering the entire implement movable through a vertical path of travel. This attachment includes an elongated platform 20 having a pair of end walls 22 and 24 extending upwardly therefrom and a back wall 26.

Mounted along the normally forward edge of the platform 20 is a sickle bar having a reciprocable sickle 28 driven by mechanism 30 operably connected to a rotatable shaft 32.

The end wall 22 has mounted thereon a substantially L-shaped arm 34. This arm 34 is slidably received by a pair of tubular brackets 36 and 38, the bracket 36 being slidable within a slot 40 in the end wall 22 and held in a predetermined position by a bolt or the like 42. The bracket 38 serves to pivotally mount the arm 34 by means of a bolt or the like 44 passing through any one of a number of arcuately disposed openings 46. Arm 34 carries a bearing 48 by means of a bolt or the like 44 passing through any one of a number of arcuately disposed openings 46. Arm 34 carries a bearing 48 at the normally forward end thereof for journaling one of a pair of stub shafts 50. An arm 49 pivotally joined at one end thereof to wall 24 is also swingable for selective fastening in one of openings 51 in wall 24. A bearing 53 on arm 49 receives the other stub shaft 50. These stub shafts 50 are mounted within an elongated tubular member 52 forming a part of a rotatable reel broadly designated by the numeral 54. In addition to these stub shafts 50 and tubular member 52, this reel 54 consists of three spaced apart discs 56 secured directly to the tubular member 52 and having a plurality of fins 58 disposed therebetween.

As clearly illustrated in Fig. 2 of the drawing, there are four of these fins 58 and each has its outermost longitudinal edge bent at right angles to form a flange 60. As will hereinafter be more fully described, the reel 54 rotates in the direction indicated by an arrow in Fig. 4 and the flanges 60 of the fins 58 are disposed with their free longitudinal edges in a trailing position with respect to the direction of travel of reel 54. Any suitable means for interconnecting the tubular member 52, the fins 58 and discs 56 such as welding, may be used.

As noted particularly in Figs. 1 and 3, the two end discs 56 are curved outwardly toward the proximal bearing 48 and 53, to the end that growing hay coming into contact with the implement adjacent these outermost discs 56 will not become entangled in the respective arms 34 and 49 but will be pushed aside. Such hay that is maintained outwardly from the normally outermost curved disc 56 is gathered into the implement and toward the sickle 28 by a conventional divider 62 mounted directly upon the adjacent end wall 22.

It is to be noted that the axis of rotation of the reel 54 is directly above the sickle 28 and may be moved toward and away from sickle 28 through manipulation of the arms 34 and/or 49 as above described. This reel 54 may thus be moved in a horizontal path toward and away from the back wall 26 or in a vertical path of travel by swinging movement of the arms 34 and 49.

Mounted directly above the platform 20 and forwardly of the back wall 26, is a helix broadly designated by the numeral 64. This helix 64 has a tubular member 66 provided with stub shafts 68 at each end thereof, which in turn are journaled in bearing 70 mounted directly upon the end walls 22 and 24.

The convolutions 72 forming the helix 64 at one end thereof are disposed in a spiral running in one direction while the convolutions 74 at the opposite end thereof, are disposed oppositely. An opening 76 is formed in the back wall 26 for receiving the lowermost end of a conveyor 78 and also for receiving a rotatable spinner 80. The conveyor 78 is disposed at an angle upwardly toward the cutter 10 and passes around two pairs of spaced apart sprockets 82 and 84. The sprocket wheels 82 are mounted directly upon a shaft 86 while the sprockets 84 are mounted upon a shaft 88.

As shown in Fig. 2, the cutter 10 chosen for illustration has a pair of rollers 89 for receiving the cut crop from conveyor 78, a packer 90, and a rotatable cutter 91 cooperable with a plate 93 in the usual manner. The spinner 80 is rotatably mounted upon a shaft 96 and includes a plurality of fins 98 extending radially from a sleeve 100 telescoped upon the shaft 96. These fins 98 are formed in much the same manner as the fins 58 of reel 54 and have a plurality of laterally turned flanges 102 extending in a trailing relationship with respect to the direction of rotation with this spinner 80 as indicated by the arrow in Fig. 4 of the drawings.

Actuation of all of the parts above described with the exception of the component parts of cutter 10 and the reciprocable sickle 28 is through the medium of the shaft 88 which is joined to the prime mover 12 in a conventional manner, not shown. Rotation of this shaft 88 to move the conveyor 78 in the direction indicated by the arrow in Fig. 4, obviously causes rotation of shaft 86 and the two spaced apart sprocket wheels 82 thereon. In addition to these two sprocket wheels 82, the shaft 86 carries a gear 104 in mesh with a gear 106 thereabove and mounted upon a stub shaft 108. Rotation of the gear 104 in the direction indicated by an arrow in Fig. 5 will rotate the gear 106 as indicated and its stub shaft 108.

Stub shaft 108 carries a sheave 110 joined with a pulley wheel 112 by a belt or the like 114. Rotation of stub shaft 108, sheave 110 and pulley 112 in the direction indicated in Fig. 4 causes rotation of the spinner 80 because of the fact that the pulley 112 is mounted directly upon the shaft 96 which receives the spinner 80. In addition to the gear 106 and sheave 110, the stub shaft 108 carries a sprocket 116 joined with a sprocket 118 mounted upon one of the stub shafts 68 of the helix 64 by a chain or the like 120. This said one stub shaft 68 having sprocket wheel 118 thereon, also carries a small sheave 122 with a pulley 124 by a belt or the like 126. This pulley 124 is mounted directly upon the proximal stub shaft 50 of reel 54.

It is clear from the foregoing that rotation of the shaft 88 drives the spinner 80, helix 64 and the reel 54 all in the same direction by virtue of the gears 104 and 106. The entire assembly, including the platform 20 and all associated parts are carried by a shoe 128 in the conventional manner.

In operation, as the implement is transported through a field of growing hay or the like to move the sickle 28 to a position where such crop is cut, the reel 54 will move such cut crop toward the helix 64. Rotation of these two members 54 and 64 will move the individual stalks of cut hay to a flat condition upon the platform 20. The individual stalks will have their longitudinal axes disposed in parallelism and in transverse relationship to the longitudinal axes of reel 54 and helix 64 respectively.

It is to be noted as illustrated in Fig. 2 of the drawings that the helix 64 is disposed relatively close to the uppermost face of platform 20 and when such helix 64 rotates, the stalks of hay will be moved toward the conveyor 78 by a sliding action imparted thereto. In other words, these stalks of hay remain in a flat condition upon the platform 20 and the helix 64 serves to slide such stalks in a direction transversely to their longitudinal axes. The two oppositely disposed convolutions 72 and 74 of helix 64 cause such stalks of hay to gather at the opening 76 within back wall 26. Helix 64 then serves to move such cut crop toward the conveyor 78, the latter of which moves the crop upwardly toward the chopper 90. It is readily seen that the longitudinal axes of all of the stalks of hay will move upwardly along the conveyor 78 in parallelism and that the spinner 80 will bear against such hay and aid the conveyor 78 in its function of so moving the cut crop. When the hay reaches the chopper 91, the blades thereof will be in transverse relationship to the longitudinal axes of the individual stalks and consequently, they will be cut into relatively small particles. In no event will any of the stalks of hay or the like move into the chopper 91 sideways and pass through the cutting assembly 10 without first being chopped into small particles.

A suitable blower (not shown) forming a part of the cutting assembly 10, directs the small particles of hay into a wagon or truck box in the conventional manner. It is to be noted that all of the rotatable parts 80, 64 and 54 cooperate in maintaining the stalks of hay in the parallel position above described. The laterally turned flanges 60 of the reel 54 and the like flanges 102 of spinner 80, move against the hay and obviate the wrapping of such hay therearound. In other words, these flanges 60 and 102 impart a general pushing action upon the cut crop without the tendency of carrying the same therearound as these members 80 and 54 respectively, rotate. By the same token, the hay that is deposited upon the platform 20 does not rotate and tangle around the helix 64 as the latter rotates but remains flatly upon the uppermost face of platform 20 and is moved by a sliding action upon platform 20 between the relatively small space between helix 64 and platform 20.

The implement above described has proved to be extremely satisfactory in actual use because of the fact that every stalk of the hay cut by the sickle 28 is chopped into small particles prior to the same being blown into an ultimate transportation means and no large bunches of tangled stalks or long pieces thereof are to be found in the finished product.

Inasmuch as only one modification of the structural details has been illustrated and described, it is desired to be limited only by the spirit of this invention and not by specific details of construction, many of which could be practically changed and modified.

Having thus described the invention, what is claimed as new and desired to be secured by Letters Patent is:

1. In a crop handling implement, the combination of an elongated, horizontal platform having crop cutting means along the normally forwardmost, longitudinal edge thereof; a helix above the platform and mounted for rotation on a horizontal axis substantially parallel with said edge; and an elongated reel mounted for rotation above said cutting means forwardly of said helix and on an axis parallel with said axis of the helix, said reel having a plurality of fins extending radially outwardly from said axis of the reel, said fins extending the entire length of the reel.

2. In a crop handling implement, the combination of an elongated, horizontal platform having crop cutting means along the normally forwardmost, longitudinal edge thereof; a helix above the platform and mounted for rotation on a horizontal axis substantially parallel with said edge; and an elongated reel mounted for rotation above said cutting means forwardly of said helix and on an axis parallel with said axis of the helix, said reel having a plurality of fins extending radially outwardly from said axis of the reel, said fins extending the entire length of the reel, each fin having a flange on the outermost free edge thereof projecting laterally and in a direction counter to the direction of rotation of the reel.

3. In a crop handling implement, the combination of an elongated, horizontal platform having crop cutting means along the normally forwardmost, longitudinal edge thereof; a helix above the platform and mounted for rotation on a horizontal axis substantially parallel with said edge; an elongated reel mounted for rotation above said cutting means forwardly of said helix and on an axis parallel with said axis of the helix, said reel having a plurality of fins extending radially outwardly from said axis of the reel, said fins extending the entire length of the reel; and a support for the reel shiftably mounted for movement of the reel toward and from the helix and the cutting means.

EDWIN A. JONES.

REFERENCES CITED

The following references are of record in the file of this patent:

UNITED STATES PATENTS

| Number | Name | Date |
|---|---|---|
| 1,901,092 | Fisk | Mar. 14, 1933 |
| 1,960,596 | Rimple | May 29, 1934 |
| 2,253,633 | Lindly | Aug. 26, 1941 |
| 2,269,828 | Michel et al. | Jan. 13, 1942 |
| 2,332,006 | Oehler | Oct. 19, 1943 |
| 2,394,996 | Hill et al. | Feb. 19, 1946 |
| 2,426,922 | Carroll | Sept. 2, 1947 |
| 2,435,563 | Acton | Feb. 10, 1948 |